(12) United States Patent
Keefe et al.

(10) Patent No.: US 8,386,589 B2
(45) Date of Patent: Feb. 26, 2013

(54) SYSTEM THAT PROVIDES EMBEDDED SOFTWARE TO AN EMBEDDED SYSTEM

(75) Inventors: Derrick Keefe, Ottawa (CA); Dan Cardamore, Kanata (CA)

(73) Assignee: QNX Software Systems Limited, Kanata, Ontario (CA)

( * ) Notice: Subject to any disclaimer, the term of this patent is extended or adjusted under 35 U.S.C. 154(b) by 372 days.

(21) Appl. No.: 12/785,273

(22) Filed: May 21, 2010

(65) Prior Publication Data

US 2011/0289493 A1 Nov. 24, 2011

(51) Int. Cl.
*G06F 15/177* (2006.01)
*H04L 9/32* (2006.01)
*G01S 19/05* (2010.01)

(52) U.S. Cl. .............. 709/220; 713/171; 342/357.42

(58) Field of Classification Search ............ 709/220
See application file for complete search history.

(56) References Cited

U.S. PATENT DOCUMENTS

| | | | | |
|---|---|---|---|---|
| 2004/0093597 A1* | 5/2004 | Rao et al. | ...... | 717/171 |
| 2004/0117494 A1* | 6/2004 | Mitchell et al. | ...... | 709/230 |
| 2007/0293183 A1* | 12/2007 | Marlowe | ...... | 455/345 |
| 2008/0092227 A1 | 4/2008 | Eibach et al. | ...... | 726/12 |
| 2010/0004849 A1* | 1/2010 | Jeong | ...... | 701/200 |
| 2010/0037057 A1* | 2/2010 | Shim et al. | ...... | 713/171 |
| 2010/0057624 A1* | 3/2010 | Hurt et al. | ...... | 705/76 |
| 2010/0161720 A1* | 6/2010 | Colligan et al. | ...... | 709/203 |
| 2011/0029644 A1* | 2/2011 | Gelvin et al. | ...... | 709/220 |
| 2011/0163914 A1* | 7/2011 | Seymour | ...... | 342/357.42 |

FOREIGN PATENT DOCUMENTS

WO WO 2005/039161 A1 4/2005

OTHER PUBLICATIONS

System and Method for Upgrading Firmware in a Vehicle, dated Mar. 2003, p. 1, IP.COM Journal, IP.COM Inc., West Henrietta, NY.

* cited by examiner

*Primary Examiner* — Brian P Whipple
*Assistant Examiner* — James Edwards
(74) *Attorney, Agent, or Firm* — Brinks Hofer Gilson & Lione

(57) ABSTRACT

A system automates the provision of embedded software to an embedded system. The system may include a portable device having a portable device application that provides the embedded software to the embedded system, a communication link coupling the portable device to the embedded system, and an embedded software manager that accesses one or more embedded software components through the communication link.

36 Claims, 4 Drawing Sheets

SYSTEM THAT PROVIDES EMBEDDED SOFTWARE TO AN EMBEDDED SYSTEM

BACKGROUND OF THE INVENTION

1. Technical Field

This disclosure relates to embedded software and more particularly to a system that provides embedded software to an embedded system.

2. Related Art

Systems that execute embedded software may require updates to add features or correct errors. The software may be updated through physical connections to a source or through removable storage media. Both processes may be costly and inconvenient.

In vehicles, for example, powertrain systems, entertainment systems, and comfort systems, may require software updates. Some updates are expensive as they may only be programmed by original equipment manufacturers or dealers. Some updates are outdated before installation, as they are not installed as they become available.

Some in-vehicle systems interface external devices such as media players and phones. As these devices are updated, compatibility with in-vehicle systems may be lost as the in-vehicle systems are not upward-compatible. A loss of compatibility may prevent the vehicles and external devices from communicating freely or sharing data without the aid of an intermediary device. In the end, some systems will not support the operations and features of the original device or the new features added through the update as the in-vehicle software cannot support the software or hardware used in the external devices.

SUMMARY

A system automates the provision of embedded software to an embedded system. The system may include a portable device having a portable device application that provides the embedded software to the embedded system, a data link coupling the portable device to the embedded system, and an embedded software manager that automatically detects the software within the embedded system and automatically connects to a communication link to access the embedded software.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

An embedded system may perform one or more specific functions or tasks. The system may update and process data. One or more external processors, controllers, or clusters may interface the embedded system to support other applications and external peripherals. The processors, controllers, or clusters may be portable and may automatically connect to the embedded system thought a wireless or physical link. A software manager may automatically detect software versions or features of the embedded system periodically (e.g., daily, weekly, monthly, etc.), may inform or hide deployments from end-users, and/or may automatically bridge or operate as a gateway to automatically update some or all of the software of the embedded system making it partially or entirely extensible. The updates may occur through a deferred (e.g. batch) process or at a same or similar rate as the software or data is received (e.g., real-time).

Communication between the embedded system and a device may occur through a wireless protocol or network. Device transceivers may provide short and/or long range radio, optical link, or operational links that may or may not require a physical communication path to receive or transmit data. The communication protocol or network may provide an interoperable communication link between an embedded system and external applications and/or the external device. In some systems, the device (e.g., processor and transceiver) may provide connectivity when the wireless network or a wireless service provider indicates a channel capacity or excess channel capacity to transfer some or all of the desired data or software to the embedded system or external device. A source push may load the desired data or software to a destination and may keep the connection open to allow a source to send the desired data or software and respond to any device requests (e.g., queries). Some devices may pull data as needed in which a communication connection may or may not remain open.

Figure 1:
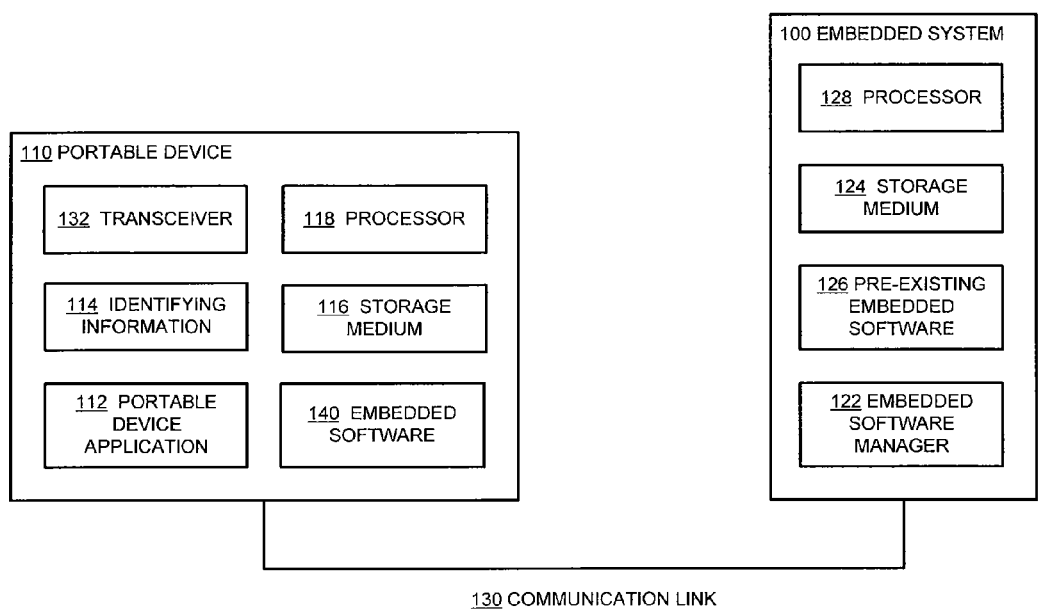
FIG. 1 is a system that provides embedded software to an embedded system.

FIG. 1 is a system 100 that provides embedded software to an embedded system 120. The system 100 may include a portable device 110 such as a portable digital device that retains a portable device application 112 in a local memory or firmware. A wireless or tangible communication link 130 may connect the portable device 110 to the embedded system 120 and an embedded software manager 122. The portable device 110 may include a microcontroller, digital signal processor, and/or a processor 118 that executes program instructions stored on a non-transitory or computer-readable storage medium 116. The optional transceiver 132 may link the portable device to the embedded system 120 and/or and other external sources or nodes.

The transceiver 132 may be compliant with one or more cellular or wireless protocols, a wireless or cellular telephone, a radio, a satellite, or other wireless communication systems may link the portable device 110 to a privately accessible or publicly accessible distributed network or directly to an intermediate surrogate or to central source. The communication link 130 may comprise Mobile-FI or a low-cost, always-on, mobile broadband wireless network that may have IP (Internet Protocol) roaming & handoff (at more than about 1 Mbit/s), MAC and PHY with IP and adaptive antennas, full mobility or substantial mobility up to vehicle speeds of about 88.7-162 km/h or higher (e.g., 250 km/h), operate in frequency bands (below 3.5 GHz), and/or utilize a packet architecture and have a low latency. In some applications, the transceiver 132 may be Ultra-wideband compliant and may transmit information by generating radio energy at specific time instants and occupying large bandwidth, thus enabling a pulse-position or time-modulation communications. This protocol may be different from other wireless protocols that transmit information by varying the power level, frequency, and/or phase of a sinusoidal wave. In other applications, the system may be complaint with WiMax or IEEE 802.16a or may have a frequency band within a range of about 2 to about 11 GHz, a range of about 31 miles, and a data transfer rate of about 70 Mbps. In other applications, the transceiver 132 may be compliant with a Wi-Fi protocols or multiple protocols or subsets (e.g., ZigBee, High Speed Packet Access, High Speed Downlink Packet Access and/or High Speed Uplink Packet Access), Bluetooth, Mobile-Fi, Ultrawideband, Wi-Fi, WiMax, mobile WiMax, cellular, satellite, etc., (referred to as the transceiver protocols) that may be automatically detected and selected (through a handshaking, for example, that may automatically determine the source type of the transmission e.g., by a query for example, and may attempt to match it) and may enable this automatic access through one or more communication nodes. In some portable devices 110, automatic selection and/or detection may occur through an exchange of signals that acknowledge a communication or a transfer of information or data may occur at a desired or predetermined channel capacity. In some circumstances, some portable device 110 may not directly communicate or connect to a central source. Like a mesh network, the transceiver 132 may transmit information between themselves (like an electronic buck brigade) which may be relayed to a destination. Built in logic may allow some transceivers 132 to relay information from one device 110 to another separate device 110 when wireless networks are unavailable, device 110 failures occur, bandwidth restrictions occur, or other conditions warrant. In some applications, a receive-and-relay feature in some portable devices 110 may allow portable devices 110 to conserve power by not transmitting data or messages continuously and directly to source.

In FIG. 1, the embedded system 120 comprises a dedicated system programmed to perform one or a few specialized functions. Some embedded systems 120 include a processor 128 that executes embedded software or firmware. In vehicles, the software may perform powertrain functions, entertainment functions, comfort functions, or travel functions such as, for example, in-vehicle telematics functions (e.g., a navigation system or an infotainment system). The applications or software may be stored on a non-transitory medium or computer-readable storage medium executed by one or more in-vehicle microcontroller, digital signal processor, and/or processors.

Some portable device applications 112 include an embedded software component 140. The embedded software component 140 may add new features to the embedded system 120 or may update or correct errors in the embedded software 126. In some applications, the embedded software component 140 may include software that plugs-into the embedded software 126, one or more files, and/or executable code. The embedded software component 140 may comprise machine code, portable code (e.g., Adobe Flash®, Sun Java™, etc.,) and/or code that is not compatible with the processor 118 resident to the portable device 110. In some applications, the portable device 110 may treat the embedded software component 140 as a data payload.

Some embedded software managers 122 verify the publisher of the software or the integrity of the embedded software component 140. The integrity may be validated through an integrated or remote cryptographic validation controller resident to or interfaced to the portable device 110 and/or embedded system 120. Some cryptographic validation controllers may include a certificate service. The embedded system manager 122 may verify compatibility of the embedded software component 140 with the embedded system 120 prior to its execution or transfer to the storage medium 124.

The embedded software manager 122 may access the embedded software component 140 through the communication link 130. Some embedded software managers 122 download the embedded software component 140 locally into a long-term memory (e.g., a persistent memory), some download the embedded software component 140 locally into a fast storage buffer or cache memory, and some access the embedded software component 140 through a remote access to a remote system. When executed by the embedded system 120, the embedded software component 140 may enable interoperability between the embedded system 120 and the portable device 110. Some portable devices 130 may be pre-configured with a new or future release of embedded software components 140 that makes the embedded system 120 upward and/or downward compatible.

In some applications, the portable device 110 may obtain identification information 114 for the embedded system 120. The identification information 114 may include an embedded system 120 identifier, a preexisting embedded software 126 identifier, a preexisting embedded software 126 version identifier, and access credentials to the embedded software component 140. The credentials may include, for example, a login identification and password, or a certificate. Each identifier may include a Universally Unique Identifier (UUID), a type indicator, and a version indicator.

Figure 2:
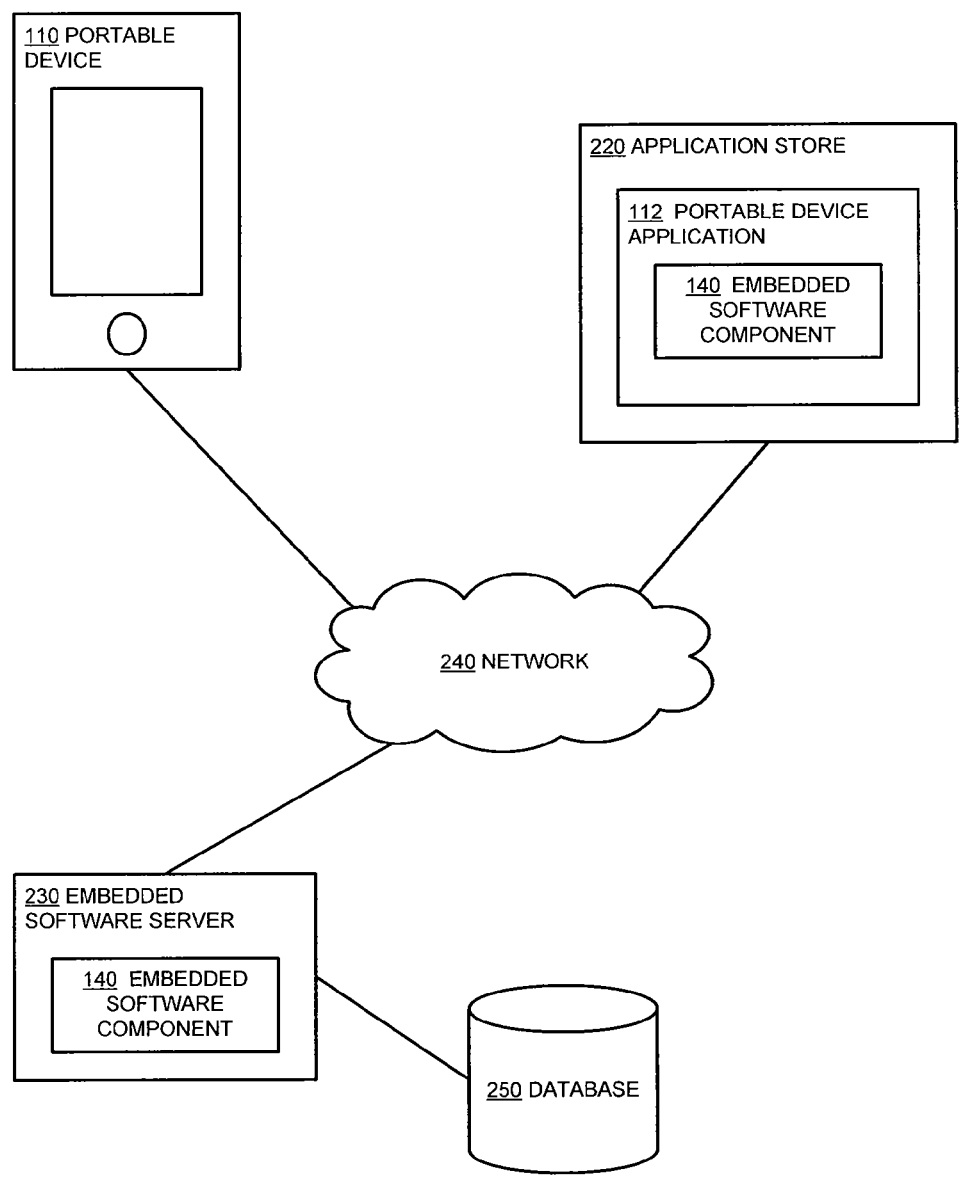
FIG. 2 is a portable device coupled to alternative sources of embedded software.

FIG. 2 is a portable device 110 coupled to alternative sources 220 and 230 of embedded software components 140. The portable device 110 may be coupled to (e.g. be in data communications with) an application store 220 or an embedded software cluster or server 230 through a network 240 like a publicly accessible distributed network (like the Internet) and/or a privately accessible distributed network. The portable device 110 may couple a source e.g., 220 or 230 of embedded software components while in or out of communication with the embedded system 120.

An application store 220 may comprise an on-line site that supports the selection and downloading of application software for the portable device 110. When connected to the application store 220, embedded software components 140 may be automatically selected through the identification information 114 of the embedded system 120. The embedded software component 140 may be contained (e.g., encapsulated in, appended to, etc.) in a selected portable device application 112 as data. Some portable device applications 112 may include processor executable instructions that are not executable by the processor 118 on the portable device 110. The application store 220 need not be aware that the portable device application 112 contains the embedded software component 140, and may manage the portable device application 112 as it would other applications available for the portable device 110 including those that do not contain an embedded software component 140. Version marking of the embedded software component 140 may be reflected in the version marking of the portable device application 112. For example, each distinct version of an embedded software component 140 may be associated with a distinct version of the portable device application 112.

An embedded software cluster or server 230 may respond to requests from a client such as the portable device 110. When some portable devices 110 are coupled to the embedded software server 230, selection of an embedded software component 140 may be based on embedded system identification. The embedded software server 230 may use the identification information 114 to access a configuration and a known embedded software version from a remote or local central or distributed database 250, database management system, or other storage systems. The selected embedded software component 140 may comprise a data file, an executable file, a self-installing application, or a combination of file formats. The selected embedded software component 140 may be downloaded to the portable device 110.

Figure 3:
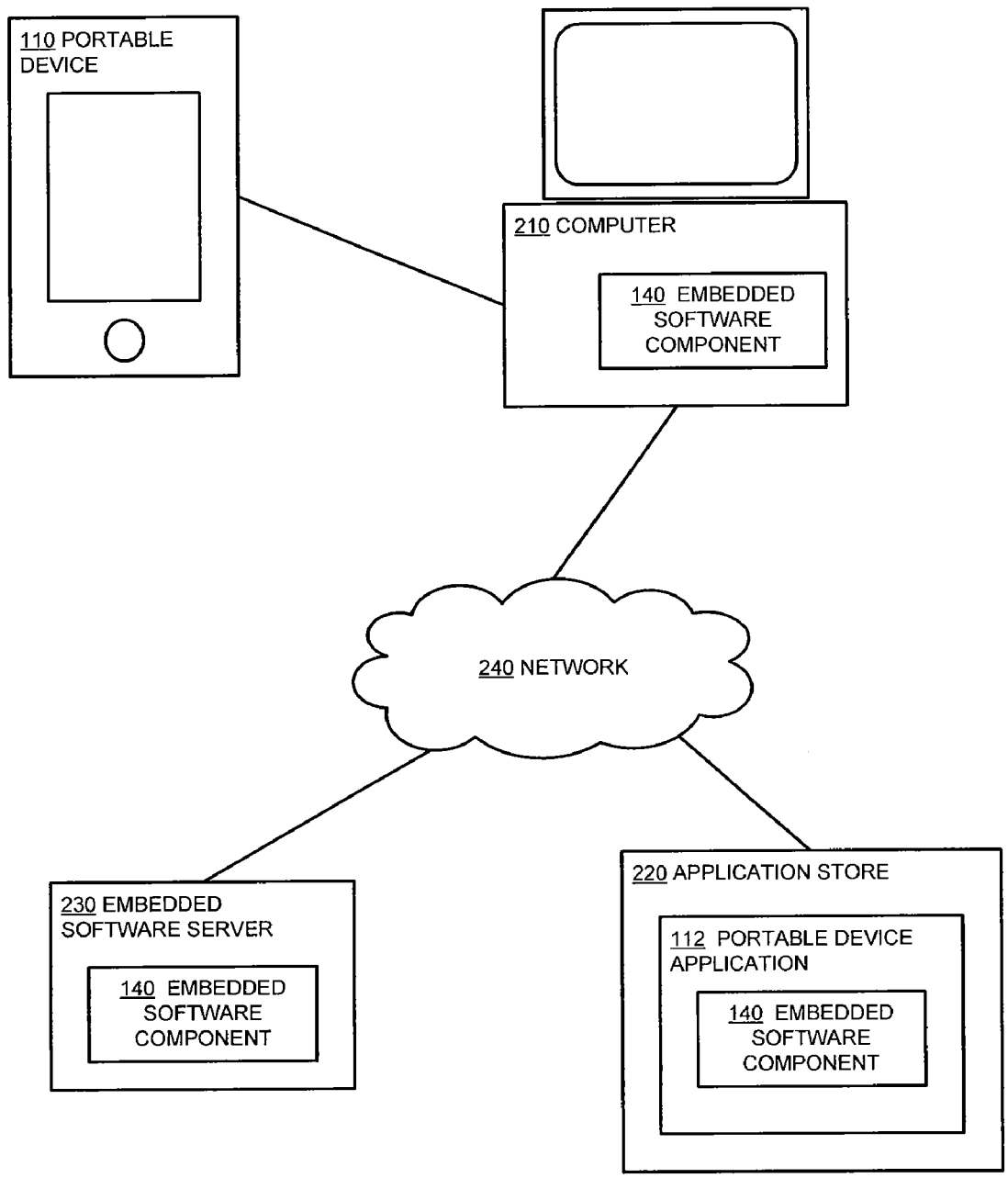
FIG. 3 is a portable device coupled to a further alternative source of embedded software.

FIG. 3 is a portable device 110 in communication with a further alternative source of embedded software. The portable device 110 may couple (e.g., be in data communications with) a remote or local computer 210 through a Universal Serial Bus, Bluetooth protocol, WiFi protocol, and/or other protocols described herein or a combination thereof. When coupled to the computer 210, the portable device 110 may transmit an embedded system 120 identifier 114 that identifies an appropriate release of the portable device 110 and/or embedded software 126. In some alternative portable devices 110 the identifier 114 by itself or with other indicia, may indicate how a selected release should be configured (or maintain it in a default configuration) to the settings within the embedded system 120 within the computer 210, portable device 110, and/or embedded system 120. Some setting specific to the embedded system 120 (that may be included or appended to the identifier 114) may determine how the selected release is stored, when or how the release is installed (e.g., the software may include a mandatory deployment date), and when existing software is removed or placed in a dormant state or memory partition (but not removed). In some alternative embedded systems 120, a portable device 110 and embedded software manager 122 (and processors 118/128 in some applications) may reevaluate a release and may re-activate the legacy software, re-install a previously selected release, or request another release that is in compliance with the embedded system 120, the portable device 110, and/or desired or measured evaluation results. Some or all legacy software may be removed from the embedded system following an evaluation schedule, after a device cycle, or by a default setting or schedule.

In FIG. 3, the identification information 114 may allow the computer 210 to select one or more embedded software component 140 to be downloaded to the portable device 110. The selected embedded software component 140 may be retrieved locally or remotely from a database, database management system, or other storage systems through a public/private accessible distributed network. When a computer 210 obtains an embedded software component 140 from a remote application store 220, the embedded software component 140 may be contained in a portable device application 112 obtained from the application store 220.

The portable device application 112 may be executed by the processor 118 on the portable device 110. The portable device application 112 may receive or retrieve the identification information 114 from the embedded system 120 and store the identification information 114 on the storage medium on the portable device 110. The portable device application 112 may. deliver or sent identification information 114 to alternative sources 210, 220 and 230. Some portable device applications 112 may specify a service location for obtaining the embedded software component 140 from sources such as the distributed servers 210, 220 and/or 230.

The embedded software component 140 may be managed by the software manager 122 and executed by the embedded system processor 128. Some embedded software components 140 may be stored locally in a non-volatile memory or retained in a volatile cache memory, and/or may be remotely accessed through a distributed persistent or volatile memory. The embedded system processor 128 may execute embedded software components 140 while in or out of communication with the portable device 110. In some applications, the embedded software component 140 may provide new or updated embedded software or embedded data (e.g., navigational map data) to the embedded system 120 at a user's direction and/or automatically.

Figure 4:
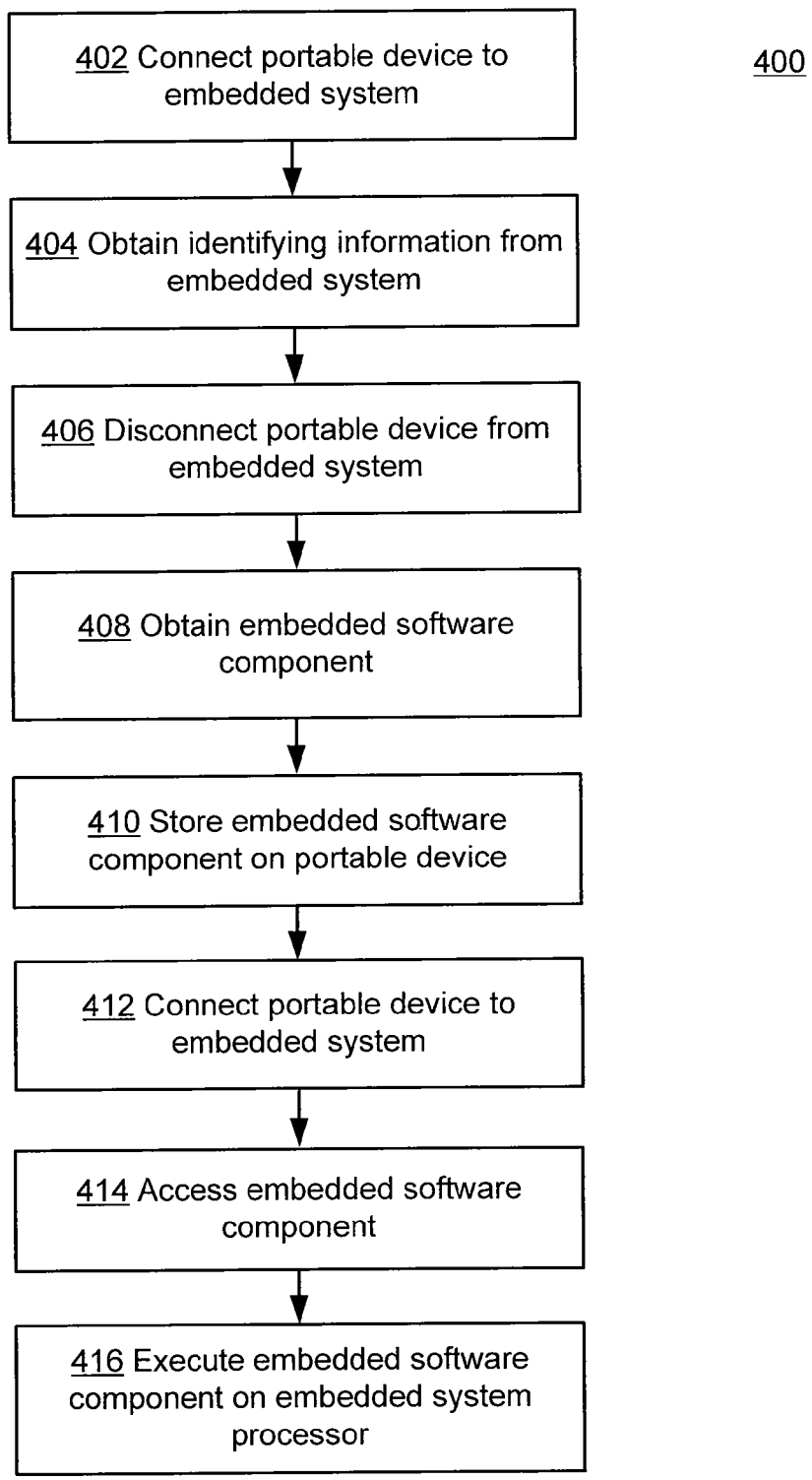
FIG. 4 is a method that provides embedded software to an embedded system.

FIG. 4 is a method 400 for providing embedded software to an embedded system 120. The method 400 may be implemented through the systems, components, or devices described and/or shown in the figures. At 402, a device connects to the embedded system through a communication link. At optional act 404 the device obtains (or assigns) identifying indicia from (or to) the embedded system. At optional act 406 the portable device may disconnect from the embedded system. At 408, the device may obtain an embedded software component 140. Some devices may obtain the embedded software component by connecting directly to a source of embedded software components; others may access the embedded software through an intermediary process (or device). Embedded software components may be received from a local or remote computer, server, or cluster, an application store or site, or a version tracking controller or site. The device may connect one or more sources of embedded software components whether or not it is in communication or coupled to an embedded system through a local process that transmits or receives signals. Some sources of embedded software components may require authentication of the device based on the credentials associated with, contained, or appended to identifying indicia obtained at 404. The embedded software component 140 may be selected through the indicia. The device 110 may download the embedded software component 140 from the local and/or distributed sources through wireless or tangible mediums. Alternatively, the device may contain one or many updates (e.g., it may be pre-configured). At 410, the device 110 may store the embedded software component in a non-transitory or computer-readable medium. At 412, the device 110 may reconnect or maintain its connection to the embedded system 120. At 414, the device 110 may provide the embedded system 120 access to the embedded software component. At 416, a local or remote processor on or in communication with the embedded system may execute the embedded software component. The embedded software component may be executed locally on the embedded software system or remotely which may occur when the software is executed through the device, a peripheral site, or through a cloud computing architecture. Prior to execution, some embedded systems may verify a publisher and/or the integrity of the embedded software component 140 through a cryptographic process that may include certificates. Verification of compatibility with other software on the embedded system 120 may also optionally be carried out.

Other alternate systems and methods may include combinations of some or all of the structure and functions described or shown in one or more or each of the figures. These systems or methods are formed from any combination of structure and function described or illustrated within the figures. Some alternative systems may comprise acts of providing embedded system that include any of delivering or transmitting the embedded system. Some alternative systems or devices may interface other peripheral devices (e.g., a smart phone, a mobile phone, a personal digital assistant (PDA), a portable media player, etc.,) that may facilitate remote communication through a local or wide area network through wireless or physical telegraphy. Wireless connectivity through one or more wireless networks provide high speed connections that allow users to initiate or complete a communication at any time while stationary or on the move (e.g., during vehicle operation or motion).

Each of the systems and methods may be encoded in a signal bearing medium, a computer readable medium such as a memory, programmed within a device such as one or more integrated circuits, or processed by a controller or a computer. If the functional acts are encoded in software, the software may reside in a memory resident to or interfaced to any other type of non-volatile or volatile memory interfaced, or resident to a communication device. The memory may include an ordered listing of executable instructions for implementing logical functions. A logical function may be implemented through digital circuitry, through source code, through analog circuitry, or through an analog source such through an analog electrical, or optical signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, a non-transitory apparatus, or device that may also execute instructions.

A "computer-readable medium," "machine-readable medium," and/or "signal-bearing medium" may comprise any apparatus that contains, stores, communicates, or transports data and/or software for use by or in connection with an instruction executable system, apparatus, or device. The machine-readable medium may selectively be, but not limited to, an electronic, magnetic, optical, electromagnetic, infrared, or semiconductor system, apparatus, devices. A non-exhaustive list of examples of a machine-readable medium would include: an electrical connection "electronic" having one or more tangible connections, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system that provides embedded software to an embedded system comprising:
   a portable device having a portable device application programmed to provide an embedded software component to the embedded system, where the portable device obtains identification information of the embedded system;
   a communication link between the portable device and the embedded system; and
   an embedded software manager resident to the embedded system for accessing the embedded software component through the communication link, where the embedded software component is obtained by the portable device from an application store based on the identification information of the embedded system, where the application store comprises an on-line site that supports selection and downloading of application software for the portable device, and where the embedded software component is inexecutable on the portable device.

2. The system of claim 1, where the embedded software component is transferred to the embedded system for execution by a processor.

3. The system of claim 1, where the embedded software component is cached on the embedded system.

4. The system of claim 1, where the embedded software component is accessed from the portable device for execution by a processor in the embedded system.

5. The system of claim 1, where the embedded software component, when executed by a processor in the embedded system, provides interoperability between the embedded system and the portable device.

6. The system of claim 1, where the embedded software component, when executed by the processor in the embedded system, maintains compatibility between the embedded system and the portable device.

7. The system of claim 1, where the embedded software component comprises an update to existing embedded software installed on the embedded system.

8. The system of claim 1, where the embedded software component is appended to a portable device application for execution by a processor in the portable device.

9. The system of claim 1, where the embedded software component comprises any of: a plug-in, one or more files, and binary code.

10. The system of claim 1, where the embedded software component comprises portable code that is independent of the embedded system architecture.

11. The system of claim 1, where the embedded software component comprises machine code for execution by a processor in the embedded system.

12. The system of claim 1, where the embedded software manager verifies the publisher or the integrity of the embedded software component prior to execution of the embedded software component.

13. The system of claim 1, where the embedded software manager verifies compatibility of the embedded software component with the embedded system prior to execution of the embedded software component.

14. The system of claim 1, where the portable device obtains the embedded software component from an embedded software component server, through a communication connection, responsive to identification indicia or credentials obtained from the embedded system.

15. The system of claim 1, where the portable device obtains the embedded software component from a local or remote computer, through a communication connection, responsive to identification indicia obtained from the embedded system.

16. The system of claim 1, where the embedded software component comprises a pre-configured component in the portable device.

17. The method of claim 1, where the embedded system comprises an in-vehicle infotainment system.

18. The method of claim 1, where the portable device comprises a smart phone, a mobile phone, a personal digital assistant, or a portable media player.

19. A method that provides embedded software to an embedded system comprising:
   establishing a communication link between a portable device and the embedded system;
   storing on the portable device an embedded software component that is selected by the portable device from an application store based on credentials of the embedded system, where the application store comprises an on-line site that supports selection and downloading of application software for the portable device; and transferring, to the embedded system, the embedded software component obtained on the portable device responsive to the credentials of the embedded system, where the embedded software component is executable with a processor in the embedded system, and where the embedded software component is inexecutable on the portable device.

20. The method of claim 19, where the embedded software component is cached on the embedded system for execution by the processor in the embedded system.

21. The method of claim 19, where the embedded software component is accessed from the portable device for execution by the processor in the embedded system.

22. The method of claim 19, where the embedded software component when executed by the processor in the embedded system provides interoperability between the embedded system and the portable device.

23. The method of claim 19, where the embedded software component when executed by the processor in the embedded system maintains compatibility between the embedded system and the portable device.

24. The method of claim 19, where the embedded software component is an update to pre-existing embedded software on the embedded system.

25. The method of claim 19, where the embedded software component is appended to a portable device application for execution by a processor in the portable device.

26. The method of claim 19, where the embedded software component comprises any of: a plug-in, one or more files, and binary code.

27. The method of claim 19, where the embedded software component comprises portable code that is independent of the embedded system architecture.

28. The method of claim 19, where the embedded software component comprises machine code for execution by the processor in the embedded system.

29. The method of claim 19, where the embedded software manager verifies the publisher or the integrity of the embedded software component prior to execution of the embedded software component.

30. The method of claim 19, where the embedded system verifies compatibility of the embedded software component with the embedded system prior to execution of the embedded software component.

31. The method of claim 19, further comprising:
obtaining, by the portable device, the embedded software component from an embedded software component server or remote cluster, through a communication connection, responsive to identification indicia or credentials obtained from the embedded system.

32. The method of claim 19, further comprising:
obtaining, by the portable device, the embedded software component from a local or remote computer, through a data communication connection, responsive to identification information or credentials obtained from the embedded system.

33. The method of claim 19, where the embedded software component is pre-configured on the portable device.

34. The method of claim 19, where the embedded system comprises an in-vehicle infotainment system.

35. The method of claim 19, where the portable device comprises one of a smart phone, a mobile phone, a personal digital assistant (PDA), and a portable media player.

36. The method of claim 19, further comprising:
obtaining, on the portable device, the credentials of the embedded system from the embedded system;
disconnecting the communication link between the portable device and the embedded system after obtaining the credentials of the embedded system;
obtaining, on the portable device, the embedded software component after disconnecting the portable device from the embedded system; and reestablishing the communication link between the portable device and the embedded system before accessing the embedded software component from the embedded system.

* * * * *